US010946621B2

(12) United States Patent
Lu et al.

(10) Patent No.: US 10,946,621 B2
(45) Date of Patent: Mar. 16, 2021

(54) MULTIPLE LAYER PANELS HAVING REDUCED LEVELS OF EDGE DEFECTS

(71) Applicant: SOLUTIA INC., St. Louis, MO (US)

(72) Inventors: Jun Lu, East Longmeadow, MA (US); Kok Leong William Aw, Singapore (SG); John Joseph D'Errico, Glastonbury, CT (US)

(73) Assignee: Solutia Inc., St. Louis, MO (US)

( * ) Notice: Subject to any disclaimer, the term of this patent is extended or adjusted under 35 U.S.C. 154(b) by 14 days.

(21) Appl. No.: 16/002,334

(22) Filed: Jun. 7, 2018

(65) Prior Publication Data

US 2018/0281354 A1   Oct. 4, 2018

Related U.S. Application Data (63) Continuation of application No. 14/496,677, filed on Sep. 25, 2014, now Pat. No. 9,994,000.

(60) Provisional application No. 61/888,493, filed on Oct. 8, 2013.

(51) Int. Cl.
*B32B 17/10* (2006.01)

(52) U.S. Cl.
CPC .... *B32B 17/1055* (2013.01); *B32B 17/10036* (2013.01); *B32B 17/10761* (2013.01); *B32B 17/10871* (2013.01); *B32B 2605/00* (2013.01); *Y10T 428/31627* (2015.04)

(58) Field of Classification Search
CPC .......... B32B 17/10871; B32B 17/1055; B32B 17/10036
See application file for complete search history.

(56) References Cited

U.S. PATENT DOCUMENTS

| | | | |
|---|---|---|---|
| 2,282,026 A | 5/1942 | Bren et al. | |
| 2,282,057 A | 5/1942 | Hopkins et al. | |
| 3,234,062 A * | 2/1966 | Morris | B32B 17/10036 156/104 |
| 3,402,139 A | 9/1968 | Mont et al. | |
| 4,671,913 A | 6/1987 | Gen et al. | |
| 5,130,370 A * | 7/1992 | Udipi | C08L 29/14 524/443 |
| 5,536,347 A | 7/1996 | Moran | |
| 5,728,472 A | 3/1998 | D'Errico et al. | |
| 7,117,914 B2 | 10/2006 | Chick | |
| 7,143,800 B2 | 12/2006 | Chick | |
| 7,476,284 B2 | 1/2009 | Sklyarevich et al. | |
| 7,510,771 B2 | 3/2009 | Lu | |
| 7,704,342 B2 | 4/2010 | Bourcier et al. | |
| 9,994,000 B2 | 6/2018 | Lu et al. | |
| 2003/0148114 A1 * | 8/2003 | Bourcier | B32B 17/10 428/432 |
| 2005/0166639 A1 * | 8/2005 | Skeen | B32B 17/10761 65/104 |
| 2008/0060744 A1 * | 3/2008 | Sklyarevich | B32B 17/10036 156/104 |
| 2008/0185096 A1 | 8/2008 | Karpinski et al. | |
| 2008/0210287 A1 * | 9/2008 | Volpp | B32B 17/10036 136/244 |
| 2009/0071589 A1 * | 3/2009 | Moeyersons | B32B 17/10036 156/104 |
| 2010/0285310 A1 | 11/2010 | Izutani et al. | |
| 2011/0247754 A1 | 10/2011 | Canfield | |
| 2013/0149503 A1 * | 6/2013 | Yamamoto | B32B 17/10568 428/172 |
| 2013/0236693 A1 | 9/2013 | Lu | |
| 2013/0236711 A1 | 9/2013 | Lu | |
| 2015/0099132 A1 | 4/2015 | Lu | |

FOREIGN PATENT DOCUMENTS

| | | |
|---|---|---|
| EP | 1907204 | 4/2008 |
| WO | 2012/029916 | * 3/2012 |

OTHER PUBLICATIONS

PCT International Search Report and Written Opinion dated Jan. 6, 2015 for International Application No. PCT/US2014/058725.
Vinyl Acetal Polymers, in Encyclopedia of Polymer Science & Technology, $3^{rd}$ edition, vol. 8, pp. 381-399, by B.E. Wade (2003).
Supplementary European Search Report dated Mar. 17, 2017 for European Patent Application No. 14852758.3.
Zhao Jinzhu et al., "Glass Deep Processing Technology and Equipment", Chemical Industry Press, Jun. 2012, pp. 232-235.
Office Action dated Jul. 20, 2016 for co-pending U.S. Appl. No. 14/496,677.
Office Action dated Jan. 19, 2017 for co-pending U.S. Appl. No. 14/496,677.

(Continued)

*Primary Examiner* — Margaret G Moore
(74) *Attorney, Agent, or Firm* — Michael K. Carrier; Steven A. Owen (57) ABSTRACT

A process for producing a multilayer glass laminate panel having two glass sheets with a poly(vinyl butyral) interlayer sandwiched therebetween, the process comprising the steps of: providing two glass sheets; providing a poly(vinyl butyral) interlayer, and inserting the interlayer between the two glass sheets to produce a laminate; removing air from the produced laminate; applying heat and pressure to the laminate for a hold time, wherein the laminate is free of bubbles at the edges of the laminate. The multilayer glass laminate panel has improved optical properties, and specifically reduced levels of edge defects, such as edge bubbles in the laminate.

7 Claims, 2 Drawing Sheets

(56) References Cited

OTHER PUBLICATIONS

Office Action dated Jun. 1, 2017 for co-pending U.S. Appl. No. 14/496,677.
Office Action dated Dec. 13, 2017 for co-pending U.S. Appl. No. 14/496,677.
Notice of Allowance dated Apr. 25, 2018 received in co-pending U.S. Appl. No. 14/496,677.

* cited by examiner

FIG. 1
Effect of Autoclaving Pressure on Edge Bubble Formation

FIG. 2
Effect of Autoclaving Temperature on Edge Bubble Formation

FIG. 3
Effect of Autoclaving Soak Time on Edge Bubble Formation

MULTIPLE LAYER PANELS HAVING REDUCED LEVELS OF EDGE DEFECTS

CROSS REFERENCE TO RELATED APPLICATIONS

This Application is a continuation of U.S. Non-Provisional patent application Ser. No. 14/496,677 filed Sep. 25, 2014, now U.S. 9,994,000, which claims the benefit of U.S. Provisional Patent Application Ser. No. 61/888,493, filed Oct. 8, 2013, the entire disclosure of which is incorporated by reference herein.

BACKGROUND OF THE INVENTION

This disclosure is related to the field of multiple layer panels (also referred to as multilayer glass laminate panels) having reduced levels of edge defects and optimized autoclave cycle conditions for producing improved multiple layer panels having at least one polymer interlayer sheet. Specifically, this disclosure is related to the field of optimized autoclave cycle conditions for producing improved multiple layer panels having at least one polymer interlayer sheet and having reduced levels of edge defects.

Multiple layer panels are generally panels comprised of two sheets of a rigid substrate (such as, but not limited to, glass, polyester, polyacrylate, or polycarbonate) with one or more polymer interlayers sandwiched therebetween. The laminated multiple layer glass panels are commonly utilized in architectural window applications, in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer may also give the glass a much higher sound insulation rating, reduce UV and/or IR light transmission, and enhance the aesthetic appeal of the associated window.

In order to achieve the desired and optimal sound insulation for the glass panel, it has become common practice to utilize interlayers having special properties. In some cases, multilayered interlayers with at least one soft "core" layer sandwiched between two more rigid "skin" layers are used as the interlayer in a multilayer glass laminate panel. These interlayers are generally produced by mixing a polymer resin such as poly(vinyl butyral) with one or more plasticizers and melt processing the mix into a sheet by any applicable process or method known to one of skill in the art, including, but not limited to, extrusion. For multilayer interlayers, the layers are generally combined by processes such as co-extrusion and lamination. Other additional ingredients may optionally be added for various other purposes. After the interlayer sheet is formed, it is typically collected and rolled for transportation and storage and for later use in the multiple layer glass panels, as discussed below.

Contemplated polymer interlayers include, but are not limited to, polyvinyl acetals (PVA) (such as polyvinyl butyral (PVB)), polyurethane (PU), poly(ethylene-co-vinyl acetate) (EVA), polyvinylchloride (PVC), polyethylenes, polyolefins, ethylene acrylate ester copolymers, poly(ethylene-co-butyl acrylate), silicone elastomers, epoxy resins, and acid copolymers such as ethylene/carboxylic acid copolymers and its ionomers, derived from any of the foregoing possible thermoplastic resins. Multilayer laminates can include multiple layer glass panels and multilayer polymer films. In certain embodiments, the multiple polymer films in the multilayer laminates may be laminated together to provide a multilayer film or interlayer. In certain embodiments, these polymer films may have coatings, such as metal, silicone or other applicable coatings known to those of ordinary skill in the art. The individual polymer films which comprise the multilayer polymer films may be laminated together using an adhesive as known to those of ordinary skill in the art.

The interlayer may be a single layer, a combination of more than one single layer, a multilayer that has been coextruded, a combination of at least one single layer and at least one multilayer, or a combination of multilayer sheets.

The following offers a simplified description of the manner in which multiple layer glass panels are generally produced in combination with the interlayers. First, at least one polymer interlayer sheet (single or multilayer) is placed between two substrates and any excess interlayer is trimmed from the edges, creating an assembly. It is not uncommon for multiple polymer interlayer sheets or a polymer interlayer sheet with multiple layers (or a combination of both) to be placed within the two substrates creating a multiple layer glass panel (also referred to herein as a multilayer glass laminate panel) with multiple polymer interlayers. Then, air is removed from the assembly by an applicable process or method known to one of skill in the art; e.g., through nip rollers, vacuum bag, vacuum ring or another de-airing mechanism. Additionally, the interlayer is partially pressbonded to the substrates by any method known to one of ordinary skill in the art. In a last step, in order to form a final unitary structure, this preliminary bonding (or adhesion) is rendered more permanent by a high temperature and pressure lamination process, or any other method known to one of ordinary skill in the art such as, but not limited to, autoclaving. Additional parameters and details of the autoclaving will be further discussed below.

One of the problems in the manufacture of multilayer laminate glass panels is the presence of edge defects, such as bubbles, in the final unitary structure or panel. The bubbles may be formed during the lamination process, after the lamination process while in storage or use, or both. These bubbles or edge defects are typically formed near the edge, such as from about 2 to 3 mm from the edge, of the glass panels. The edge bubbles are typically round shaped ranging from a few tenths of a millimeter to about one millimeter (about 0.1 mm or more to about 1 mm) in diameter. Other bubbles or edge defects can form at the very edge or further in from the edge of the glass panels. It is not uncommon for bubbles or edge defects to form five millimeters or more from the edge of the glass panels. The bubbles or edge defects cause optical defects in the final multilayer glass laminate panel, such as a windshield, affect edge integrity of the panel, affect the bonding of the interlayer to the glass substrates, and are unacceptable to the final customer.

One source for air or other gases accounting for edge bubbles is the de-airing process. During the manufacturing process of laminated multiple layer glass panels, air and other gases often become trapped in the interstitial spaces between the substrates and the interlayer or between the individual layers of the multilayered interlayer when these layers are stacked together to form the multilayered interlayer other than co-extrusion.

As noted above, trapped air is generally removed in the glazing or glass panel manufacturing process by vacuum or nip roll de-airing the construct. However, these technologies are not always effective in removing all of the air trapped in the interstitial spaces between the substrates. These pockets of air are particularly evident with mismatched glass (e.g., tempered glass, heat strengthened glass, and thick, annealed glass) and in windshields, where the curvature of the glass generally results in gaps of air. These gaps of air in windshields are commonly referred to as "bending gaps." Additionally, when a bending gap is present during autoclaving, heat and pressure compress the glass to conform to the interlayer and narrow the gap, resulting in high stresses in the glass in the original gap area.

Since de-airing technologies are not always effective in removing all of the air from the glass panel assembly, there is normally residual air present between the glass and interlayer. During autoclaving, the residual air dissolves into the interlayer under heat (temperature) and pressure. When a large amount of residual air (e.g., excessive residual air) is present in the interlayer, air bubbles can nucleate, especially at high temperatures, as the interlayer becomes soft and is less resistant to the nucleation.

In warm or hot climates, especially during the summer season, the temperature of glass can elevate to 50° C. to 100° C. or more in multilayer glass laminate panels installed in buildings and vehicles. At these elevated temperatures, forces due to stresses in glass panels or windshields exert pressure on the glass perpendicularly to their plane and in the opposite direction, pulling the glass panels away from each other in an effort to restore them to their original states. This pressure or stress reduces the resistance of the air to nucleation and expansion, and it allows the bubbles to grow in the interlayer, particularly around the edges of the panel or windshield.

Another source for air or other gases accounting for edge bubbles is the autoclaving step or process. A typical autoclaving cycle involves the following steps: (1) heating and pressurizing the inside of the autoclave chamber (that is filled with multilayer glass laminate panels, such as windshields) to a pre-defined maximum temperature and pressure; (2) holding the temperature and pressure constant at the pre-defined maximum level for a period of time; (3) reducing the temperature while holding pressure constant; and (4) releasing the pressure to atmospheric pressure once the temperature reaches about ambient or room temperature. The temperature at which the autoclave pressure is released is commonly referred as pressure release temperature or pressure dump temperature. Optionally, during step (1), the pressure and temperature can gradually and simultaneously be increased; the temperature gradually increases first and is then followed by the pressure increasing or vice versa; or the temperature and pressure can be increased simultaneously first, then as the temperature continues to increase the pressure is held at a pressure level less than maximum for a short period of time before it is increased to the maximum pressure. During step (3), as the temperature is decreasing, the pressure can be decreased in steps rather than being held constant. Finally, during step (4), the pressure release temperature can be at room temperature or slightly above room temperature, generally in the range of about 30° C. to about 55° C. Regardless of how each of the steps can be changed, the maximum temperature (often referred as "soak temperature" or "hold temperature" or "autoclave temperature"), maximum pressure (often referred as "soak pressure" or "hold pressure" or "autoclave pressure"), and the time (often referred as "soak time" or "hold time" or "autoclave time") at which the maximum temperature and pressure are held are three key parameters for fabricating a multilayer glass laminate panel or laminated safety glass to achieve the required properties and performance.

The conventional wisdom of autoclaving for producing multiple layer panels is to use as high a temperature and pressure as possible to promote the bonding (or adhesion) of an interlayer to the substrates and to remove the surface of the interlayer to promote better (or stronger) adhesion of the interlayer to the substrates. Conventionally, the typical autoclave temperature is above 140° C. or above 150° C., and the typical pressure is about 12 to 14 bars. The typical hold time at which the temperature and pressure stay at the maximum level can be about 20 minutes to about 60 minutes for multilayer glass laminate panels, such as windshields or side glass laminates (also referred to as "side lites"), and 20 minutes to several hours for multilayer glass laminate panels for laminated architectural glass where thicker glass and often thicker interlayers are used. As will be further discussed below, a significant amount of air is dissolved in the interlayer in the multilayer glass laminate panel during the autoclave process.

The presence of edge bubbles in the final unitary structure of a multilayer laminate glass panel can be problematic because a certain degree of optical quality and clarity is necessary in many (if not most) of the end-use commercial applications of multilayer laminate glass panels (e.g., vehicular, aeronautical and architectural applications). Thus, the creation of multilayer laminate glass panels with commercially acceptable levels of edge defects (that is, where the level of edge defects is very low, or particularly where edge bubbles are eliminated and there are no edge defects) is paramount in the art of multilayer glass laminate panel manufacturing.

Summarized, optical quality defects such as edge defects (or edge bubbles) and other visible optical defects, as well as edge integrity, are common problems in the field of multiple layer glass panels, particularly those used in applications which require higher levels of optical or visual quality and edge integrity. Accordingly, there is a need in the art for the development of a process for producing a multilayer glass laminate panel that resists or prevents the formation of edge bubbles during the autoclave cycle or after autoclaving without a reduction in other optical, mechanical, and acoustic characteristics of the multilayer laminate glass panel.

SUMMARY OF THE INVENTION

Because of these and other problems in the art, described herein, among other things is a process for producing a multilayer glass laminate panel comprising two glass sheets with a poly(vinyl butyral) interlayer sandwiched therebetween, the process comprising the steps of: providing two glass sheets; providing a poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure of less than about 11 bars, and the hold time is in a range of from about 10 minutes to about 60 minutes, wherein the laminate is free of bubbles at the edges of the laminate.

In another embodiment, disclosed is a process for producing a multilayer glass laminate panel comprising two glass sheets with a poly(vinyl butyral) interlayer sandwiched therebetween, the process comprising the steps of: providing two glass sheets; providing a poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure of less than about 11 bars, and the hold time is in a range of from about 10 minutes to about 60 minutes, wherein the laminate is free of bubbles at the edges of the laminate.

A multiple layer panel having reduced levels of edge defects made by the process is also disclosed. The panel has improved optical properties and reduced (or even eliminated) edge defects such as bubbles.

In another embodiment, a multilayer glass laminate panel is disclosed, wherein the multilayer glass laminate panel is produced by a process for producing a multilayer glass laminate panel comprising two glass sheets with a poly (vinyl butyral) interlayer sandwiched therebetween, the process comprising the steps of: providing two glass sheets; providing a poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure in a range of from about 2 bars to about 11 bars, and the hold time is in a range of from about 10 minutes to about 60 minutes, wherein the laminate is free of bubbles at the edges of the laminate. The multilayer glass laminate panel may be a windshield.

In another embodiment, a multilayer glass laminate panel, wherein the multilayer glass laminate panel is produced by a process for producing a multilayer glass laminate panel comprising two glass sheets with a poly(vinyl butyral) interlayer sandwiched therebetween, the process comprising the steps of: providing two glass sheets; providing a multilayer poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure in a range of from about 2 bars to about 11 bars, and the hold time is in a range of from about 10 minutes to about 60 minutes, wherein the laminate is free of bubbles at the edges of the laminate is disclosed. The multilayer glass laminate panel may be a windshield.

DESCRIPTION OF THE PREFERRED EMBODIMENT(S)

Described herein, among other things, is a process for improving multilayer glass laminate panels by optimizing autoclaving conditions and post-autoclave conditions. Also disclosed are multilayer glass laminate panels having improved qualities, such as improved optical quality and lower levels of edge defects such as edge bubbles. Although laminators have been producing multilayer laminate glass panels for many years, it was not previously recognized that the autoclave parameters or properties had a significant effect on the amount of air that is dissolved in the interlayer in the multilayer laminate glass panel. As a result of the improved process and optimized autoclave conditions disclosed herein, higher quality, multilayer glass laminate panels having reduced levels of edge defects are produced.

Disclosed is a process for producing a multilayer glass laminate panel comprising two glass sheets with a poly (vinyl butyral) interlayer sandwiched therebetween, the process comprising the steps of: providing two glass sheets; providing a poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure of less than about 11 bars, and the hold time is in a range of from about 10 minutes to about 60 minutes, wherein the laminate is free of bubbles at the edges of the laminate. In an embodiment, the heat is at a temperature in the range of from about 115° C. to about 150° C. In an embodiment, pressure is at a pressure of from about 2 to about 10 bars. In an embodiment, the hold time is in a range of from about 10 minutes to about 40 minutes, or about 20 minutes to about 40 minutes. In an embodiment, the multilayer glass laminate panel is a windshield.

In another embodiment, a process for producing a multilayer glass laminate panel comprising two glass sheets with a poly(vinyl butyral) interlayer sandwiched therebetween, the process comprising the steps of: providing two glass sheets; providing a multilayer poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure of less than about 11 bars, and the hold time is in a range of from about 10 minutes to about 60 minutes, wherein the laminate is free of bubbles at the edges of the laminate is disclosed. In an embodiment, the multilayer glass laminate panel is a windshield.

In an embodiment, a multilayer glass laminate panel having reduced levels of edge defects made by the process is also disclosed.

In an embodiment, interlayers especially suitable for use in the optimized autoclave process are also disclosed. In an embodiment, the interlayers are high flow interlayers. The panels comprising the interlayers have improved optical properties and reduced (or even eliminated) edge defects such as bubbles.

In another embodiment, a multilayer glass laminate panel, wherein the multilayer glass laminate panel is produced by a process for producing a multilayer glass laminate panel comprising two glass sheets with a poly(vinyl butyral) interlayer sandwiched therebetween, the process comprising the steps of: providing two glass sheets; providing a poly (vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure in a range of from about 2 bars to about 11 bars, and the hold time is in a range of from about 10 minutes to about 60 minutes, wherein the laminate is free of bubbles at the edges of the laminate is disclosed. The multilayer glass laminate panel may be a windshield.

In another embodiment, a multilayer glass laminate panel, wherein the multilayer glass laminate panel is produced by a process for producing a multilayer glass laminate panel comprising two glass sheets with a poly(vinyl butyral) interlayer sandwiched therebetween, the process comprising the steps of: providing two glass sheets; providing a multilayer poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure in a range of from about 2 bars to about 11 bars, and the hold time is in a range of from about 10 minutes to about 60 minutes, wherein the laminate is free of bubbles at the edges of the laminate is disclosed. The multilayer glass laminate panel may be a windshield.

In another embodiment, a multilayer glass laminate panel is disclosed, wherein the multilayer glass laminate panel is produced by a process for producing a multilayer glass laminate panel comprising two glass sheets with a poly (vinyl butyral) interlayer sandwiched therebetween, the process comprising the steps of: providing two glass sheets; providing a multilayer poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure in a range of from about 2 bars to about 11 bars, and the hold time is in a range of from about 10 minutes to about 60 minutes, wherein the interlayer has a molecular weight less than about 140,000 Daltons, and wherein the laminate is free of bubbles at the edges of the laminate. In an embodiment, the interlayer has a flow (measured as the DF135) of greater than about 0.18 mm. In an embodiment, the interlayer has a stress relaxation at 150° C. of less than about 100 Pascals. The multilayer glass laminate panel may be a windshield.

The process for improving multilayer glass laminate panels combines a pressure of up to 11 bars with a hold or soak temperature of up to 155° C. and a hold time of up to about 60 minutes during the final lamination or autoclave cycle. The pressure can be 11 bars or less, 10 bars or less, 9 bars or less, 8 bars or less, 7 bars or less, or about 1 bar or more, or about 2 bars or more, or about 3 bars or more, or from about 1 bar to about 11 bars, or from about 2 bars to about 10 bars. The temperature can be about 155° C. or less, or about 150° C. or less, or about 145° C. or less, or about 140° C. or less, or about 135° C. or less, or about 130° C. or less. The lower end of the temperature range is only limited by the desired physical properties of the interlayer sheet and the desired end product. For example, if the interlayer sheet is a high flow material, a temperature of less than 130° C., or less than 125° C., or less than 120° C., or less than 115° C., or even less than 110° C. may be acceptable, as long as the interlayer has enough flow to promote acceptable adhesion to the glass. The hold temperature can be about 60 minutes or less, or about 55 minutes or less, or about 50 minutes or less, or about 45 minutes or less, or about 40 minutes or less, or about 35 minutes or less, or about 30 minutes or less, or about 25 minutes or less, or about 20 minutes or less, or about 10 minutes or more, or greater than about 10 minutes, or greater than about 15 minutes, or greater than about 20 minutes, or greater than about 25 minutes, or greater than about 30 minutes, or from about 10 minutes to about 60 minutes, or from about 15 minutes to about 50 minutes, or from about 20 minutes to about 40 minutes.

As will be further described below, multilayer glass laminate panels may comprise interlayers that are a single layer sheet or a multilayered sheet. A combination of one or more single layers and one or more multilayer sheets may also be used. The multilayer sheets may have any number of layers as desired. As used herein, the term "interlayer" or "interlayer sheet" may refer to a single layer or multilayer interlayer sheet.

As used herein, a multilayer glass laminate panel may comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)//(polymer interlayer sheet)//(polymer film), where the polymer interlayer sheet can comprise multiple interlayers, as noted above. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film. Generally, as used herein, a polymer film is thinner than a polymer sheet, such as from about 0.001 to 0.2 mm thick.

Further, the multilayer glass laminate panel can be what is commonly known in the art as a solar panel, with the panel further comprising a photovoltaic cell, as that term is understood by one of ordinary skill in the art, encapsulated by the polymer interlayer(s). In such instances, the interlayer is often laminated over the photovoltaic cell, with a construct such as: (glass)//(polymer interlayer)//(photovoltaic cell)//(polymer interlayer)//(glass or polymer film).

The most commonly utilized multiple layer panels comprise two substrates, preferably a pair of glass sheets (or other rigid materials, such as polycarbonate or acrylic, as known in the art), with one or more interlayers disposed between the two substrates. An example of such a construct would be: (glass)//(polymer interlayer sheet)//(glass), where the polymer interlayer sheet can comprise single or multilayered interlayers, as noted above. These examples of multiple layer panels are in no way meant to be limiting, as one of ordinary skill in the art would readily recognize that numerous constructs other than those described above could be made using the optimized autoclaving conditions and process of the present disclosure.

The typical or conventional glass lamination process comprises the following steps: (1) assembly of the two substrates (e.g., glass) and interlayer; (2) heating the assembly via an IR radiant or convective means for a short period; (3) passing the assembly into a pressure nip roll for the first de-airing; (4) heating the assembly a second time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at hold temperatures between 140° C. and 155° C. and hold pressures between 180 psig and 200 psig (about 12.4 to about 13.8 bars) for about 20 to 90 minutes, as noted above.

Other means for use in de-airing of the interlayer-glass interfaces (steps 2 to 5) known in the art and that are commercially practiced include vacuum bag and vacuum ring processes in which a vacuum is utilized to remove the air.

Multilayer glass laminate panels of the present disclosure are prepared using a process having optimized autoclave conditions. Instead of the typical or conventional autoclave conditions as described above as step 6 and as previously noted, new improved combinations of autoclave conditions having reduced temperature and/or pressure are utilized, while maintaining conventional hold times or even shorter hold times.

As previously noted, hold temperature, hold pressure, and hold time are the three key process parameters for fabricating multiple layer glass panels during the final lamination processing or autoclaving. During final lamination, temperatures typically are elevated up to about 140° C. or 150° C. or higher to soften the interlayer, helping conform it to the surface of the glass substrate and flow the interlayer into areas where the substrate spacing may be uneven. Once the interlayer is conformed, the mobile polymer chains of the interlayer develop bonding (or adhesion) with the glass. Elevated temperatures also accelerate the diffusion of residual air and/or moisture pockets from the glass/PVB interface into the polymeric interlayer (the PVB).

Pressure, which is typically held at about 12 to 14 bars, appears to play two critical roles in the production of multilayer glass laminate panels. First, pressure helps to promotes flow of the PVB between the glass or other substrates. Second, pressure compresses the glass to conform to the interlayer and narrow the gap resulting from the mismatched glass pair. Time also plays an important role in the production of multilayer glass laminate panels. While temperature and pressure can accelerate lamination, a certain critical time must always elapse to allow sufficient time for polymer interlayer to flow and to establish the adhesion to glass in order to produce good quality multilayer glass laminate panels.

Multilayer glass laminate panels, such as windshields, often develop edge defects, such as bubbles in the edge of the laminate (also referred to as edge bubbles). Edge bubble development often occurs within several minutes to a few days after autoclaving in hot and humid conditions, such as the summer time when temperature and humidity are high. In the winter time, when temperature and humidity are lower in many areas, the occurrence of the edge bubbles is normally lower. It has been determined that when higher levels of edge bubbles occur, it is generally in the summer and/or in locations or climates where the multilayer glass laminate panels, such as windshields, are exposed to higher temperatures and higher levels of humidity. In some cases, the temperature can be as high as 40° C. or more, and the relative humidity level can be 90% or more.

Various approaches have been attempted and solutions were sought to reduce and minimize the occurrence of edge bubbles, such as by reducing pressure release temperature during autoclaving, improving edge seal of the multilayer glass laminate panel and/or optimizing de-airing temperature settings and conditions. None of these approaches proved to be effective at significantly reducing or eliminating edge bubbles in the multilayer glass laminate panels. The present inventors investigated the fundamental aspects of how the edge bubbles formed in the multilayer glass laminate panels, studied the effect of autoclaving parameters on the edge bubble formation, and explored possible solutions to eliminate edge bubble formation.

The solubility and diffusivity of air in poly(vinyl butyral) ("PVB") increase with increasing temperature. As the temperature of the PVB increases, the PVB softens, which results in decreasing Gibbs free energy with respect to air dissolution. The solubility of air in a softer PVB interlayer (having a glass transition temperature, $T_g$, of about −2° C.) and a more rigid PVB interlayer (having a glass transition temperature, $T_g$, of about 30° C.) versus the temperature was measured. Data was obtained using the Permeation Test (described below) to measure the air dissolution (and therefore the solubility) at a pressure of one atmosphere. The solubility of air in the softer interlayer is about twice that of a more rigid interlayer at a temperature of 40° C. or higher. The softer PVB interlayer and the more rigid PVB interlayer can be combined to form a two-layer, three-layer, or multiple layer interlayer where the soft and rigid layer(s) can be in any order of soft/rigid layer arrangement. For example, the interlayer could be a multilayer PVB interlayer, such as a tri-layer interlayer, having a softer core (or middle) layer and more rigid skin (or outer) layers, or a PVB interlayer having a harder or more rigid core and softer skin layer(s). For the above multilayer interlayers, the solubility of air in each layer will be different. The softer layer, which can be the inner or core layer (such as in a tri-layer interlayer construct), is about twice that of the outer, or more rigid layer, which can be the outer or skin layer(s). Increasing temperature increases the solubility. Increasing temperature also softens the PVB. Therefore, the solubility of air in the softer PVB layer of a multilayer interlayer, such as the core layer, is even higher than the solubility of air in the more rigid PVB layer, such as the skin layer. While the measurement of air solubility is limited to a certain range of temperatures measured, it is expected that the increase in the air solubility beyond the temperature range where measurement was conducted will also increase as the temperature increases. This temperature dependence of the solubility in PVB indicates that the softer the PVB interlayer, the higher the solubility of air in the PVB. Since the solubility of air in PVB increases as temperature increases, one would expect that the solubility of air in PVB at autoclaving temperature will be significantly higher than that at room temperature. It is therefore expected that autoclaving under standard autoclaving conditions, such as high pressure and high temperature, will dissolve a significant amount of air in the edge of a laminate or windshield, far exceeding the solubility of air in PVB at room temperature. The ultimate solubility of air in PVB during autoclaving is independent of time and increases with increasing pressure (which increases air concentration inside the autoclave and forces air to dissolve in the interlayer). Higher pressure will dissolve more air in the edge of the laminate; low pressure will dissolve less air in the edge of the laminate.

As air dissolves in the very edge of the interlayer in a multilayer glass laminate panel, it starts to diffuse into the interior of the interlayer and away from the edge. As this cycle is repeated during the autoclaving step, more and more air is dissolved in the edge and in the interior of the interlayer of the laminate. A concentration gradient of air dissolution in the edge of the laminate is present. The distance in from the edge of the laminate that the air is dissolved is a function of time. Increasing time will increase the distance in from the edge of the laminate that the air is dissolved. The diffusivity of air in the softer PVB interlayer and the more rigid interlayer PVB interlayer versus temperature was also measured. The softer PVB interlayer and more rigid PVB interlayer(s) can be combined to create a multilayer PVB interlayer, such as a tri-layer interlayer, as discussed above. The data were obtained by the same Permeation Test as for the solubility data previously described. Similar to the effect of temperature on the solubility, the diffusivity of air in the PVB sheet increases with increasing temperature, and is higher in the softer PVB interlayer than in the more rigid PVB interlayer. Since the diffusivity of air can be understood as the rate of air diffusion, the air thus diffuses faster as temperature increases, and diffuses faster in the softer PVB interlayer than in the more rigid PVB interlayer. Therefore, the diffusivity of air in PVB at standard or conventional autoclaving temperature will be significantly higher than that at room temperature. Furthermore, in a multilayer PVB interlayer comprising the softer and more rigid PVB layers, the rate of air diffusion is different in the softer and rigid layers and the air travels faster in the softer layer.

The diffusivity (D) of air in PVB can be shown by Equation 1:

$$D = D_0 \cdot e^{-\frac{E_d}{RT}} \quad (1)$$

and by Fickian's Law of Diffusion (Equation 2):

$$n(x, t) = n(0)\text{erfc}\left(\frac{x}{\sqrt{4Dt}}\right). \quad (2)$$

Equation (1) reveals the mathematical relationship between diffusivity and temperature. Equation (2) shows the concentration (as a result of diffusion) at location x and time t as a function of diffusion length $(4Dt)^{1/2}$ and provides a measure of how far the air concentration has propagated in the x-direction by diffusion in time t. The erfc is the complementary error function.

The Permeation Test measures the Permeability (P), Diffusivity (D) and Solubility (S) of air or oxygen in PVB. Measurements were taken at three temperatures: 20° C., 40° C. and 60° C., and at 0% relative humidity using a MOCON Ox-Tran 2/20 instrument and by utilizing the "Half-time Method". Test interlayer samples were prepared by mixing resins, plasticizers, and additives under heat to form a melt, and then pressing the melt to produce 0.76 mm thick, 15 cm×15 cm test samples. The samples were placed in the test chamber and were flushed with dry nitrogen on both sides until a constant baseline was established, and then pure oxygen was introduced into one side of the sample. The instrument recorded the transient data until the permeation reached equilibrium. Permeability was deducted from the equilibrium transmission rate value. Diffusivity was calculated from $t_{1/2}$ from the transient uptake curve. Solubility was calculated using the equation: P=S×D. For the test at 60° C., the sample was placed in a remote cell located inside a high temperature oven. After the baseline was established, oxygen was introduced into the bottom side of the cell via a piece of long copper tubing.

The autoclaving process is known to promote flow of the PVB interlayer sheet under heat and pressure, to remove residual surface of the sheet, to establish the adhesion between the glass substrates and the interlayer sheet, and to produce a transparent multilayer laminated glass panel such as a windshield. Autoclaving processes also dissolve a significant amount of air in the edge of the laminated glass. As discussed above, heat (or temperature), pressure, and time (at which the multilayer glass laminate panels are held at the temperature and pressure (also referred to as "soak time")) are the three key parameters influencing the quality of the final multilayer laminated glass panels after autoclaving, such as windshields. While these parameters were essential over the past decades in the lamination of multilayer glass laminate panels such as windshields at laminators, these parameters have rarely been optimized in the consideration of edge defects or edge bubbles and amount of air dissolved in the laminates, particularly for multiple layer interlayers. Heat (temperature), pressure, and time affect the solubility and diffusivity of air in PVB, and these variables will therefore affect the amount of air that is dissolved in the PVB at the edges of the multilayer laminated glass panel and how far into the PVB the dissolved air will penetrate.

As discussed above, the air present at the edges of a multilayer laminated glass panel can come from two sources. The first source is the residual air present between the glass and interlayer after de-airing (such as nip roll, vacuum ring or vacuum bag de-airing). During the autoclaving process, the residual air dissolves into the interlayer, and in multilayer interlayers, mostly in the skin layer, under heat and pressure. The residual air located in the skin layer can move into the core layer, and it eventually partitions between skin and core layer(s) to reach an equilibrium state. As previously mentioned, the solubility of air in the core layer is about twice that in the skin layer(s). The second source is the autoclaving process itself, which involves heat and pressure and allows air to be dissolved in the PVB at the edges of the multilayer laminated glass panel. When the edges of the multilayer laminated glass panel are not well sealed, air can penetrate into the multilayer laminated glass panel edges under high pressure. When a large amount of air is present at the multilayer laminated glass panel edges, air bubbles can nucleate, especially under high temperature and humidity conditions (such as in hot and humid climates, during the summer months, and the like) as the interlayer becomes soft and is less resistant to nucleation.

In general, air favors nucleation in a soft medium. At autoclave temperatures, PVB is very soft, and the pressure of the dissolved air can be high. This pressure allows the air to expand to form bubbles. The autoclave pressure is applied in the opposite direction to that of air expansion and prevents the dissolved air from expanding. As the temperature decreases, the pressure of the dissolved air decreases as well. In order for dissolved air to nucleate and expand into bubbles, there are two forces or stresses that need to be overcome: (1) the force to deform and compress the viscoelastic PVB to allow the air bubble to nucleate and expand, and (2) the force to deflect the bound glass plate locally to allow air to expand into bubbles (this is typically the case when clusters of air bubbles are formed, but can also be true for individual bubbles). When the pressure of the dissolved air at a given temperature is below the sum of the above mentioned forces (1) and (2), bubbles will not form instantaneously. At this time (and temperature), the autoclave pressure can be safely released. Above this pressure release temperature, the risk for edge bubble formation increases.

While the pressure release temperature is an important parameter influencing whether edge bubbles are formed instantaneously in PVB and can be controlled, another issue or concern is the amount of air present and the air pressure in the edges of the PVB in the laminate. When the multilayer glass laminate panel is exposed to certain environmental conditions, edge bubbles can develop over time. The post autoclave conditions such as storage temperature and humidity are additional key parameters influencing the edge bubble formation, particularly within the first several minutes to a few days after autoclaving. This is especially true in multilayer interlayers, and particularly in the core layer of multilayer interlayers. The post autoclave conditions often change seasonally, and they may vary depending on the region of the country or the world. For example, windshields after autoclaving are more likely exposed to hot and humid weathering conditions in the summer time than in winter time, which results in moisture being absorbed rapidly along the edges of windshields.

Moisture absorption or ingress according to Fickian's Law of Diffusion in the edge of a multilayer glass laminate panel when the laminate is exposed 40° C. twenty-four (24) hours after autoclaving at three different relative humidity levels was also measured. The moisture absorbed at the edge of a windshield under high relative humidity conditions softens and swells the core layer, reducing the resistance of the core layer to air nucleating and expansion, and increasing the risk for edge bubble formation. As the bubbles form in the edges of the multilayer glass laminate panel, the pressure of the dissolved air releases, often resulting in the bubbles in the form of bursting out to the multilayer glass laminate panel edge. High post autoclave temperature also softens the core layer of a multilayer interlayer and increases the pressure of the air at the edge of the multilayer glass laminate panel.

Figure 1:
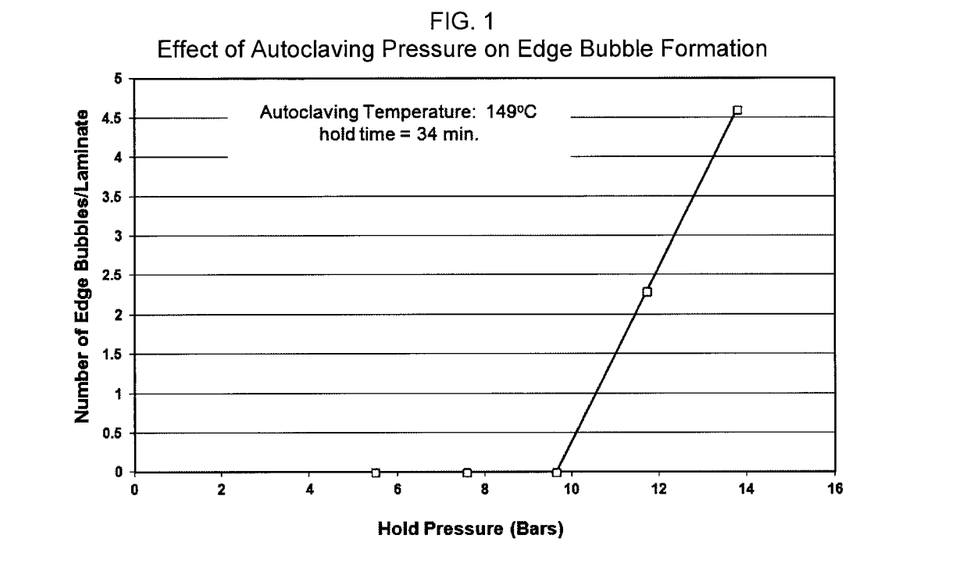
FIG. 1 is a graph showing the effect of autoclave pressure on the formation of edge bubbles in a laminated glass panel.
Figure 2:
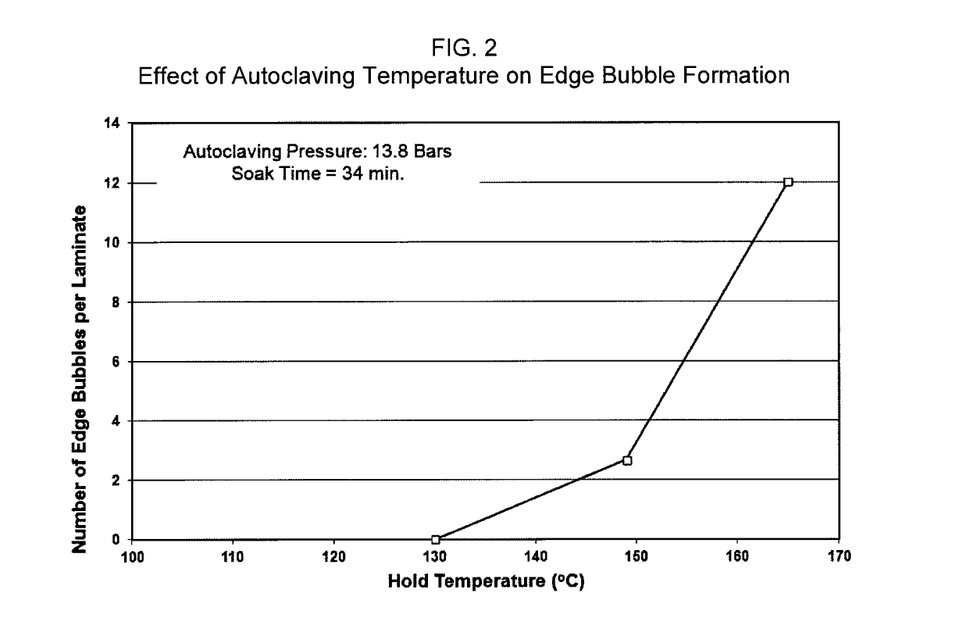
FIG. 2 is a graph showing the effect of autoclave temperature on the formation of edge bubbles in a laminated glass panel.
Figure 3:
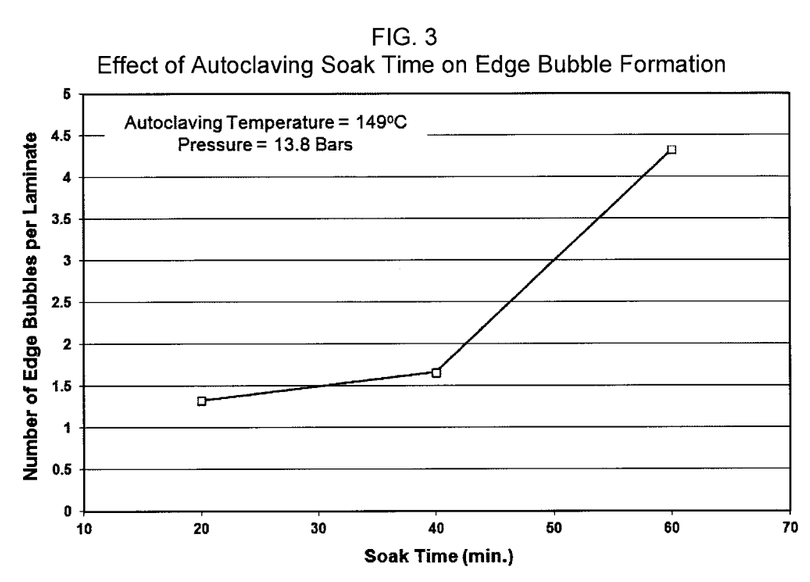
FIG. 3 is a graph showing the effect of autoclave soak time on the formation of edge bubbles in a laminated glass panel.

The effect of autoclaving parameters (hold pressure, temperature, and time) are illustrated in FIG. 1, FIG. 2 and FIG. 3. In all of the figures, the pressure release temperature was 53° C. and hold pressure, temperature, and time are indicated in the figure.

FIG. 1 shows the effect of autoclaving pressure on edge bubble formation. Pressures are in the range of from 5.5 to 13.8 bars (about 5.4 to 13.6 atmospheres or about 80 to 200 psi). As the pressure decreases, the number of edge bubbles decreases. This is true because lowering pressure results in less (or lower amounts of) air being dissolved in the edges.

The effect of autoclaving temperature on edge bubble formation is illustrated in FIG. 2. As shown in FIG. 2, reducing the temperature from 165° C. to 130° C. results in a significant reduction in the edge bubble formation. This is consistent with the fact that decreasing the temperature decreases the solubility and diffusivity of air.

FIG. 3 is a plot of the edge bubble formation versus autoclaving soak time. The number of edge bubbles decreases as the soak time decreases. Decreasing the soak time limits how far the air can penetrate into the edges and reduces the air concentration in the PVB.

The effect of pressure, temperature (heat) and soak time during autoclaving on formation of edge bubbles in a multilayer glass laminate panel correlates well with their effect on the amount of air dissolved at the edges of multilayer glass laminate panels, such as windshields. It is clear that modifying one or more of these parameters provides improvement in the final laminate or a reduction in the number of edge bubbles formed. Simple reducing pressure, temperature, or soak time alone can produce a noticeable effect on the edge bubble formation, while a combination of lower pressure, reduced temperature, and/or reduced soak time can be used to significantly reduce or even completely eliminate edge bubbles. For each lamination and autoclave process, there is an optimum autoclaving condition or window of optimum autoclaving conditions where less severe autoclaving parameters such as pressure, temperature and/or time can be used to produce multilayer glass laminate panels having a reduced level of edge bubbles or where there are no edge bubbles.

Some terminology used throughout this application will be explained to provide a better understanding of the invention. The terms "polymer interlayer sheet," "interlayer," and "polymer melt sheet" as used herein, generally may designate a single-layer sheet or a multilayered interlayer. A "single-layer sheet," as the names implies, is a single polymer layer extruded as one layer. A multilayered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; and a combination of at least one plural-layer sheet and at least one co-extruded sheet. In various embodiments of the present disclosure, a multilayered interlayer comprises at least two polymer layers (e.g., a single layer or multiple layers co-extruded) disposed in direct contact with each other, wherein each layer comprises a polymer resin, as detailed more fully below. As used herein for multilayer interlayers having at least three layers, "skin layer" generally refers to outer layers of the interlayer and "core layer" generally refers to the inner layer(s). Thus, one exemplary embodiment would be: skin layer//core layer//skin layer. It should be noted, however, further embodiments include interlayers having more than three layers (e.g., 4, 5, 6, or up to 10 individual layers). Additionally, any multilayer interlayer utilized can be varied by manipulating the composition, thickness, or positioning of the layers and the like. For example, in one trilayer polymer interlayer sheet, the two outer or skin layers may comprise poly(vinyl butyral) ("PVB") resin with a plasticizer or mixture of plasticizers, while the inner or core layer may comprise the same or different PVB resin or a different thermoplastic material with a plasticizer and/or mixture of plasticizers. Thus, it is contemplated that the skin layers and the core layer(s) of the multilayered interlayer sheets may be comprised of the same thermoplastic material or different thermoplastic materials and the same or different plasticizer or plasticizers. Either or both layers may include additional additives as known in the art, as desired.

Although the embodiments described below refer to the polymer resin as being PVB, it would be understood by one of ordinary skill in the art that the polymer may be any polymer suitable for use in a multilayer glass laminate panel. Typical polymers include, but are not limited to, polyvinyl acetals (PVA) (such as poly(vinyl butyral) (PVB) or isomeric poly(vinyl isobutyral (PVisoB)), polyurethane (PU), poly(ethylene-co-vinyl acetate) (EVA), polyvinylchloride (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and its ionomers, derived from any of the foregoing possible thermoplastic resins, combinations of the foregoing, and the like. PVB and its isomeric polymer poly(vinyl isobutyral) (PVisoB), polyvinyl chloride, and polyurethane are preferred polymers generally for interlayers; PVB (and its isomeric polymer) is particularly preferred. For example, the multilayer interlayer can consist of PVB//PVisoB//PVB. Other example includes PVB//PVC//PVB or PVB//PUHPVB. Further examples include PVC//PVB//PVC or PU//PVB//PU. Alternatively, the skin and core layers may all be PVB using the same or different starting PVB resins.

Some common components found in an interlayer, both generally and in interlayers of the present disclosure, and the formation thereof, will be discussed.

The PVB resin is produced by known aqueous or solvent acetalization processes by reacting polyvinyl alcohol ("PVOH") with butyraldehyde or isobutyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc., a subsidiary of Eastman Chemical Company.

As used herein, residual hydroxyl content (calculated as % PVOH by weight) in PVB refers to the amount of hydroxyl groups remaining on the polymer chains after processing is complete. For example, PVB can be manufactured by hydrolyzing poly(vinyl acetate) to PVOH, and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished PVB resin, there typically will be residual acetate groups (as vinyl acetate groups) and residual hydroxyl groups (as vinyl hydroxyl groups) as side groups on the polymer chain. As used herein, residual hydroxyl content is measured on a weight percent basis per ASTM D1396.

In various embodiments, the PVB resin comprises about 8 to about 35 weight percent (wt. %) hydroxyl groups calculated as % PVOH, about 13 to about 30 wt. %, about 8 to about 22 wt. %, or about 15 to about 22 wt. %; and most preferably, for certain embodiments, about 17.75 to about 19.85 wt. % hydroxyl groups calculated as % PVOH. The resin can also comprise less than 35 wt. % residual ester groups, less than 25 wt. % residual ester groups, less than 15 wt. % residual ester groups, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde acetal group, or a 2-ethyl hexanal acetal group, or a mix of any two of butyraldehyde acetal, isobutyraldehyde, and 2-ethyl hexanal acetal groups.

In various embodiments, where the interlayer is a multilayer interlayer such as a tri-layer, the residual hydroxyl contents of the PVB resins used in the skin layer(s) and core layer(s) may be different to provide certain performance characteristics. The resin for the core layer(s), for example, can comprise about 8 to about 18 wt. %, about 8 to about 16 wt. %, or about 8 to about 14 wt. % residual hydroxyl groups calculated as % PVOH. The resin for the skin layer(s), for example, can comprise about 13 to about 35 wt. %, about 13 to about 30 wt. %, or about 15 to about 22 wt. %; and most preferably, for certain embodiments, about 17.25 to about 22.25 wt. % residual hydroxyl groups calculated as % PVOH. The resin for the core layer(s) or for the skin layer(s) or for both the skin layer(s) and core layer(s) can also comprise less than 35 wt. % residual ester groups, less than 20 wt. % residual ester groups, less than 25 wt. %, less than 15% wt. %, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as an isobutyraldehyde acetal group, or a 2-ethyl hexanal acetal group, or a mix of any two of butyraldehyde acetal, isobutyraldehyde, and 2-ethyl hexanal acetal groups.

In various embodiments, the PVB resins used in the skin layer(s) and core layer(s) could also be reversed from the examples listed above. For example, the skin layer(s) could have higher residual hydroxyl groups calculated as % PVOH than the core layer(s), or the skin layer(s) could be softer than the core layer(s), or if there are more than two or three layers, any combination of hard/soft/hard/soft may be used, depending on the desired properties and application.

For a given type of plasticizer, the compatibility of the plasticizer in the PVB polymer is largely determined by the hydroxyl content of the polymer. PVB with greater residual hydroxyl content is typically correlated with reduced plasticizer compatibility or capacity, i.e., less plasticizer could be incorporated. Conversely, PVB with a lower residual hydroxyl content typically will result in increased plasticizer compatibility or capacity, i.e., more plasticizer could be incorporated. For some plasticizer types, such correlation might be reversed. Generally, this correlation between the residual hydroxyl content of a polymer and plasticizer compatibility/capacity will allow for addition of the proper amount of plasticizer to the polymer resin and more importantly to stably maintain differences in plasticizer content between multiple interlayers.

The PVB resin (or resins) of the present disclosure typically has a molecular weight of greater than 50,000 Daltons, or less than 500,000 Daltons, or about 70,000 to about 500,000 Daltons, or more preferably about 100,000 to about 425,000 Daltons, as measured by size exclusion chromatography using low angle laser light scattering. As used herein, the term "molecular weight" means the weight average molecular weight.

Various adhesion control agents ("ACAs") can be used in the interlayers of the present disclosure to control the adhesion of the sheet to glass. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), residual sodium acetate, potassium acetate, magnesium bis(2-ethyl butyrate), and/or magnesium bis(2-ethylhexanoate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride (LaB6) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

In various embodiments of interlayers of the present disclosure, the interlayer will comprise greater than 5 phr, about 5 to about 100 phr, about 10 to about 80 phr, about 30 to about 60 phr, or less than 100 phr, or less than 80 phr total plasticizer. While the total plasticizer content is indicated above, the plasticizer content in the skin layer(s) or core layer(s) of multiple layer interlayers can be different from the total plasticizer content. In addition, the skin layer(s) and core layer(s) can have different plasticizer types and plasticizer contents, in the ranges previously discussed, as each respective layer's plasticizer content at the equilibrium state is determined by the layer's respective residual hydroxyl contents, as disclosed in U.S. Pat. No. 7,510,771 (the entire disclosure of which is incorporated herein by reference). As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr, as used herein. As used herein, when the plasticizer content of the interlayer is given, the plasticizer content is determined with reference to the phr of the plasticizer in the mix or melt that was used to produce the interlayer.

In some embodiments, examples of the plasticizer include esters of a polybasic acid or a polyhydric alcohol and phosphates, among others. Suitable plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, di(butoxyethyl) adipate, bis(2-(2-butoxyethoxy)ethyl) adipate, and mixtures thereof. For the conventional plasticizer, an especially suitable plasticizer is 3GEH.

Additionally, other plasticizers, such as high refractive index plasticizers, may also be used in the interlayer of the multiple layer laminate glass panels. Examples of the high refractive index plasticizer include, but are not limited to, esters of a polybasic acid or a polyhydric alcohol, polyadipates, epoxides, phthalates, terephthalates, benzoates, toluoates, mellitates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluoate, triethylene glycol di-o-toluoate, dipropylene glycol di-o-toluoate, 1,2-octyl dibenzoate, tri-2-ethylhexyl trimellitate, di-2-ethylhexyl terephthalate, bis-phenol A bis (2-ethylhexaonate), ethoxylated nonylphenol, and mixtures thereof. Examples of particularly suitable high refractive index plasticizers are dipropylene glycol dibenzoates and tripropylene glycol dibenzoates.

Plasticizers work by embedding themselves between chains of polymers, spacing them apart (increasing the "free volume") and thus significantly lowering the glass transition temperature ($T_g$) of the polymer resin (typically by 0.5 to 4° C./phr), making the material softer. In this regard, the amount of plasticizer in the interlayer can be adjusted to affect the glass transition temperature ($T_g$). The glass transition temperature ($T_g$) is the temperature that marks the transition from the glassy state of the polymer to the rubbery state. In general, higher amounts of plasticizer loading will result in lower $T_g$. Conventional interlayers generally have a $T_g$ in the range of about 0° C. for acoustic (noise reducing) interlayer to about 45° C. for hurricane and aircraft inter- layer applications. A particularly useful $T_g$ for certain embodiments is in the range of about 27° C. to about 40° C. for the skin layers and about −5° C. to about 5° C. for the core layer(s).

An interlayer's glass transition temperature is also correlated with the stiffness of the interlayer, and in general, the higher the glass transition temperature, the stiffer the interlayer. Generally, an interlayer with a glass transition temperature of 30° C. or higher increases windshield strength and torsional rigidity. A soft interlayer (generally characterized by an interlayer with a glass transition temperature of lower than 30° C.), on the other hand, contributes to the sound dampening effect (i.e., the acoustic characteristics). An example of a multilayer interlayer having core and skin layers may have glass transition temperatures of about 30° C. or greater, about 35° C. or greater for the skin layer, and about 10° C. or less, and about 4° C. or less for the core layer. In some embodiments, multilayered interlayers in multilayer glass laminate panels may combine these two advantageous properties (i.e., strength and acoustic) by utilizing harder or stiffer skin layers laminated with a softer core layer (e.g., stiff//soft//stiff) and softer skin layers laminated with a stiffer core layer (e.g., soft//stiff//soft). In various embodiments, the multilayered interlayers generally comprise skin layers with a glass transition temperature of about 25° C. to about 40° C., about 20° C. to about 35° C., about 25° C. to 35° C., about 25° C. or greater, about 30° C. or greater, and about 35° C. or greater, and core layer(s) of about 39° C. or greater, about 35° C. or greater, about 35° C. or less, about 10° C. or less, and about 4° C. or less. For example, the following are some suitable multilayered configurations:

($T_g$>25° C.)//($T_g$<10° C.)//($T_g$>25° C.);

(25° C.<$T_g$<40° C.)//($T_g$<10° C.)//(25° C.<$T_g$<40° C.);

($T_g$<35° C.)//($T_g$>35° C.)//($T_g$<35° C.); and (20° C.<$T_g$<35° C.)//($T_g$>35° C.)//(20° C.<$T_g$<35° C.).

These configurations are merely exemplary and are in no way meant to be limiting to the types of multilayered configurations for use in multilayer glass laminate panels or in the process of the present disclosure.

The flow of the interlayer may also affect the final multilayer glass laminate panel after autoclaving. Standard flow PVB resin, having a standard flow when used as an interlayer in a multilayer glass laminate panel, typically has a molecular weight of greater than about 150,000 Daltons, as measured by size exclusion chromatography using low angle laser light scattering. As used herein, the term "molecular weight" means the weight average molecular weight. "High flow" PVB resin typically has a lower molecular weight than the standard flow PVB resin (i.e., less than about 140,000 Daltons), and this high flow PVB resin can be used to increase the flow in PVB interlayers while not negatively affecting other properties of the interlayers. Specifically, the flow of the resultant interlayer under higher temperatures is effectively increased, especially at the temperature where the PVB binds to the glass during manufacturing, such as during the autoclave step. As a result, the stress levels in windshields and laminated glass are reduced because the interlayer partially fills in the gap area during windshield assembly (e.g., de-airing) and autoclave. Moreover, the increased flow as a result of the lower molecular weight does not affect the glass transition temperature or the stiffness of the layers at normal temperature. The high flow interlayers have molecular weights of less than about 140,000 Daltons, less than about 130,000 Daltons, less than about 120,000 Daltons, less than about 110,000 Daltons. In general, the difference in molecular weight between the standard flow and high flow interlayers is at least about 5,000 Daltons, or at least about 10,000 Daltons or more. If the interlayer is a multilayer interlayer, then one or more layers, such as the skin layer(s), may contain high flow PVB resin, and the core layer(s) may contain standard flow PVB resin having a molecular weight generally greater than 140,000 Daltons, or greater than 150,000 Daltons. Examples of high flow and standard flow interlayers may also be found in US Application Publication 20130236693 A1 (the entire disclosure of which is incorporated herein by reference).

The "flow," as that term is used herein, is measured as the deformation (reduction of sample thickness normalized according to the standard interlayer thickness of 0.76 mm) when a certain point load pressure (i.e., 4.5 psi) is applied onto the sample surface in the thickness direction and when the sample is being heated from 40° C. to 135° C. at 10° C./min heating rate. In other words, as the load pressure is applied to the sample, the PVB 'spreads' or flows to the sides and the point at which the load is applied becomes thinner (or deforms a certain amount), making the PVB thickness at that point less; thus, higher deformation (i.e., a larger number) equates to higher flow at the testing temperature. The flow is commonly measured as the DF135 by a thermomechanical analysis apparatus. As an example, under the aforementioned testing, a flow of 0.242 mm means that an interlayer with 0.76 mm thickness will deform 0.242 mm in the thickness direction at the point where the load pressure is applied. A standard, conventional skin layer of a multi-layered interlayer has a flow of less than about 0.18 mm. The skin layers of high flow interlayers may have a flow of greater than about 0.18 mm, greater than about 0.19 mm, greater than about 0.20 mm, greater than about 0.22 mm, greater than about 0.23 mm, greater than about 0.24 mm, and about 0.19 mm to about 0.37 mm.

Polymer stress relaxation measurement provides another means for quantifying the flow at high temperatures such as autoclaving temperature. The stress relaxation measurement for the skin layers of the present disclosures, which utilizes a dynamic mechanical analyzer, is determined by instantaneously applying a 20% shear strain at 150° C. to the skin layer sample and holding the strain constant while the stress—e.g., the stress relaxation modulus (G'(t))—is measured as a function of time. The stress relaxation modulus measured after 100 seconds is then used to determine the relative autoclaving flow (in Pascals). The lower the stress relaxation modulus, the higher the polymer flows, and vice versa. A standard, conventional skin layer of a multilayered interlayer has a stress relaxation modulus of greater than about 110 Pascals. The high flow skin layers, on the other hand, may have a stress relaxation modulus of less than about 100 Pascals, less than about 70 Pascals, less than about 50 Pascals, and less than about 25 Pascals.

Additionally, it is contemplated that polymer interlayer sheets as described herein may be produced by any suitable process known to one of ordinary skill in the art of producing polymer interlayer sheets that are capable of being used in a multiple layer panel (such as a glass laminate or a photovoltaic module or solar panel). For example, it is contemplated that the polymer interlayer sheets may be formed through solution casting, compression molding, injection molding, melt extrusion, melt blowing or any other procedures for the production and manufacturing of a polymer interlayer sheet known to those of ordinary skill in the art. Further, in embodiments where multiple polymer interlayers are utilized, it is contemplated that these multiple polymer interlayers may be formed through co-extrusion, blown film, dip coating, solution coating, blade, paddle, air-knife, printing, powder coating, spray coating or other processes known to those of ordinary skill in the art. While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes.

The final interlayer, whether formed from extrusion or co-extrusion, generally has a random rough surface topography as it is formed through melt fractures of polymer melt as it exits the extrusion die and may additionally be embossed over the random rough surface on one or both sides (e.g., the skin layers in a multilayer interlayer) by any method of embossment known to one of ordinary skill in the art. An example of such an embossment method is disclosed in U.S. Pat. No. 4,671,913 (the entire disclosure of which is incorporated herein by reference). The embossment creates minute raised and depressed portions on the surface of the polymer interlayer, which has been shown to be effective in enhancing the de-airing process and reducing the occurrence of air bubbles. The consistent surface roughness and channels help to reduce the amount of air available for bubble nucleation and expansion.

In its most basic sense, extrusion is a process used to create objects of a fixed cross-sectional profile. This is accomplished by pushing or drawing a material through a die of the desired cross-section for the end product. Extrusion processes are well known in the art.

Generally, the thickness, or gauge, of the polymer interlayer sheet will be in a range from about 15 mils to 100 mils (about 0.38 mm to about 2.54 mm), about 15 mils to 60 mils (about 0.38 mm to about 1.52 mm), about 20 mils to about 50 mils (about 0.51 to 1.27 mm), and about 15 mils to about 35 mils (about 0.38 to about 0.89 mm). In various embodiments, each of the layers, such as the skin and core layers, of the multilayer interlayer may have a thickness of about 1 mil to 99 mils (about 0.025 to 2.51 mm), about 1 mil to 59 mils (about 0.025 to 1.50 mm), 1 mil to about 29 mils (about 0.025 to 0.74 mm), or about 2 mils to about 28 mils (about 0.05 to 0.71 mm).

Pummel adhesion is one parameter used to describe the performance of the polymer interlayers, and more specifically, the interlayers in a multilayer laminate glass panel or glazing, disclosed herein. The Pummel Adhesion Test is widely used throughout the world and has been a standard Solutia Inc. procedure for over 30 years. It measures the adhesion level of glass to the interlayer in a laminate construction. The interlayer to glass adhesion has a large effect on the impact resistance and long term stability of glass-interlayer structures. In this test, the laminates are cooled to 0° F. (about −18° C.) and manually pummeled with a 1 lb. (0.45 kg.) hammer on a steel plate at a 45 degree angle. The samples are then allowed to warm to room temperature and all broken glass that is not adhered to the interlayer is then removed. The amount of glass left adhered to the interlayer is visually compared with a set of standards. The standards correspond to a scale in which varying degrees of glass remained adhered to the interlayer. For example, at a pummel standard of zero, essentially no glass is left adhered to the interlayer. On the other hand, at a pummel standard of ten, essentially 100% of the glass remains adhered to the interlayer. Pummel values are grouped and averaged for like specimens. Reported values state the average pummel value for the group and the maximum range of the pummel adhesion rating for individual surfaces. The interlayers used in the multilayer laminate glass panels in the optimized process of the present disclosure have a preferred pummel adhesion rating of at least 2, greater than 2, greater than 4, greater than 6, up to 7, or from at least 2 to 7 or from 3 to 7. In other applications, the pummel application may be greater than 7 or even greater than 8, if desired for the particular application where higher pummel adhesion is necessary.

Another key performance indicator of multilayer glass laminate panels is penetration resistance. Penetration resistance is normally determined via the 2.27 kg (5 lb.) ball drop test wherein a Mean Break Height (MBH) can be measured. Penetration resistance can be measured by the staircase method or the energy method. Automotive windshields for use in vehicles in the United States must pass the minimum penetration resistance specification (80% pass at 12 feet) found in the ANSI Z26.1 code. In other parts of the world, there are similar codes that are required to be met. There are also specific code requirements in both the US and Europe for use of laminated glass in architectural applications wherein minimum penetration resistance must be met.

The staircase method utilizes an impact tower from which the steel ball can be dropped from various heights onto a 30.5 cm×30.5 cm sample. The MBH is defined as the ball drop height at which 50% of the samples would hold the ball and 50% would allow penetration through the sample. The test laminate is supported horizontally in a support frame similar to that described in the ANSI Z26.1 code. If necessary an environmental chamber is used to condition laminates to the desired test temperature. The test is performed by supporting the sample in the support frame and dropping a ball onto the laminate sample from a height near the expected MBH. If the ball penetrates the laminate, the result is recorded as a failure, and if the ball is supported (that is, does not penetrate the sample), the result is recorded as a hold. If the result is a hold, the process is repeated from a drop height 0.5 m higher than the previous test. If the result is a failure, the process is repeated at a drop height 0.5 m lower than the previous test. This procedure is repeated until all of the test samples have been used. The results are then tabulated and the percent hold at each drop height is calculated. These results are then graphed as percent hold versus height and a line representing the best fit of the data is drawn on the graph. The MBH can then be read from the graph at the point where the percent hold is 50%. In general, ten to twelve samples are used in the test to generate each MBH data point. The samples were laminated using 2.3 mm thick clear glass (commercially available from Pittsburgh Glass Works of Pennsylvania) and autoclaved using the conditions described herein.

The energy test method determines the MBH by applying the principle of conservation of energy to a ball impacting a multilayer glass laminate panel. The difference in energy contained by the ball after penetrating through a laminate is equal to the amount of energy absorbed by the multilayer glass laminate panel. The energy of the ball as it strikes the multilayer glass laminate panel can be calculated from the drop height. The energy of the ball after it exits the multilayer glass laminate panel can be determined by measuring the velocity of the ball as it passes two magnetic field detector coils which are separated by a known, fixed distance beneath the multilayer glass laminate panel. These values can then be used to calculate the MBH.

In order to achieve acceptable penetration resistance (or impact strength) for a multilayer glass laminate panel, it is essential for the interfacial glass/PVB adhesion levels to be maintained at about 3 to 7 Pummel units. Generally, acceptable penetration resistance is achieved at a pummel adhesion value of about 3 to 7, or about 4 to 6. At a pummel adhesion value of less than 2, too much glass is lost from the sheet and glass spalling during impact as well as problems with multilayer glass laminate panel integrity (such as delamination) and long term durability can occur. At a pummel adhesion value of more than 7, adhesion of the glass to the interlayer sheet is generally too high and results in a multilayer glass laminate panel with poor energy dissipation and low penetration resistance.

The flow of the PVB interlayer during the autoclave step is evaluated by the Regenerated Surface Test. The Regenerated Surface Test looks at the amount of the surface pattern or texture of the interlayer is "regenerated" after autoclaving, and it is measured as follows. After autoclaving, a piece of PVB interlayer is separated from the multilayer laminate glass panel. The separated piece of PVB interlayer is then placed in boiling water for 5 minutes. After 5 minutes, the PVB interlayer is removed from the water, and the surface is examined visually or under a microscope. A smooth surface (that is, a surface that is free of any texture or pattern) on the PVB interlayer indicates a complete flow of the PVB interlayer under the autoclaving condition to which it was subjected. A rough surface (that is, a surface that has any texture or pattern remaining) indicates incomplete flow of the interlayer during the autoclaving step. The extent of the texture or pattern remaining on the surface can be used to evaluate how well the PVB flows under the autoclaving condition.

The process of the present invention is not limited to interlayers having specific properties, such as, for example, a certain moisture level or moisture within a specific range, a certain flow level, or a type of plasticizer(s). Multilayer glass laminate panels having reduced levels of edge defects, such as edge bubbles, can be produced using the optimized conditions and process described above when using any desired interlayer.

The invention also includes the following Embodiments 1 to 19, set forth below.

Embodiment 1 is a process for producing a multilayer glass laminate panel comprising two glass sheets with a poly(vinyl butyral) interlayer sandwiched therebetween, the process comprising the steps of: providing two glass sheets; providing a poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure of less than about 11 bars, and the hold time is in a range of from about 10 minutes to about 60 minutes, wherein the laminate is free of bubbles at the edges of the laminate.

Embodiment 2 is a process for producing a multilayer glass laminate panel comprising two glass sheets with a poly(vinyl butyral) interlayer sandwiched therebetween, the process comprising the steps of: providing two glass sheets; providing a multilayer poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure in a range of from about 2 bars to about 11 bars, and the hold time is in a range of from about 10 minutes to about 60 minutes, wherein the laminate is free of bubbles at the edges of the laminate.

Embodiment 3 is a process for producing a multilayer glass laminate panel that includes the features of any of embodiments 1 to 2, wherein the heat is at a temperature in the range of from about 115° C. to about 150° C.

Embodiment 4 is a process for producing a multilayer glass laminate panel that includes the features of any of embodiments 1 to 3, wherein the heat is at a temperature in the range of from about 130° C. to about 150° C.

Embodiment 5 is a process for producing a multilayer laminate glass panel that includes the features of any of embodiments 1 to 4, wherein the pressure is at a pressure of from about 2 to about 10 bars.

Embodiment 6 is a process for producing a multilayer laminate glass panel that includes the features of any of embodiments 1 to 5, wherein the hold time is in a range of from about 20 minutes to about 40 minutes.

Embodiment 7 is a process for producing a multilayer laminate glass panel that includes the features of any of embodiments 1 to 6, wherein the multilayer glass laminate panel is a windshield.

Embodiment 8 is a multilayer laminate glass panel produced by the process of any of embodiments 1 to 7.

Embodiment 9 is a multilayer laminate glass panel produced by the process of any of embodiments 1 to 7 wherein the multilayer laminate glass panel is a windshield.

Embodiment 10 is a multilayer glass laminate panel, wherein the multilayer glass laminate panel is produced by a process for producing a multilayer glass laminate panel comprising two glass sheets with a poly(vinyl butyral) interlayer sandwiched therebetween, the process comprising the steps of: providing two glass sheets; providing a poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure in a range of from about 2 bars to about 11 bars, and the hold time is in a range of from about 10 minutes to about 60 minutes, wherein the laminate is free of bubbles at the edges of the laminate.

Embodiment 11 is a multilayer glass laminate panel, wherein the multilayer glass laminate panel is produced by a process for producing a multilayer glass laminate panel comprising two glass sheets with a poly(vinyl butyral) interlayer sandwiched therebetween, the process comprising the steps of: providing two glass sheets; providing a multilayer poly(vinyl butyral) interlayer, and inserting the interlayer between the two glass sheets to produce a laminate; removing air from the produced laminate; applying heat and pressure to the laminate for a hold time, wherein the heat is at a temperature in the range of from about 110° C. to about 155° C., the pressure is at a pressure in a range of from about 2 bars to about 11 bars, and the hold time is in a range of from about 10 minutes to about 60 minutes, wherein the laminate is free of bubbles at the edges of the laminate.

Embodiment 12 is a multilayer glass laminate panel that includes the features of any of embodiments 10 to 11, wherein the heat is at a temperature in the range of from about 115° C. to about 150° C.

Embodiment 13 is a multilayer glass laminate panel that includes the features of any of embodiments 10 to 12, wherein the heat is at a temperature in the range of from about 130° C. to about 150° C.

Embodiment 14 is a multilayer laminate glass panel that includes the features of any of embodiments 10 to 13, wherein the pressure is at a pressure of from about 2 to about 10 bars.

Embodiment 15 is a multilayer laminate glass panel that includes the features of any of embodiments 10 to 14, wherein the hold time is in a range of from about 20 minutes to about 40 minutes.

Embodiment 16 is a multilayer laminate glass panel that includes the features of any of embodiments 10 to 15, wherein the multilayer laminate glass panel is a windshield.

Embodiment 17 is a multilayer laminate glass panel that includes the features of any of embodiments 10 to 16, wherein the poly(vinyl butyral) interlayer comprises a poly(vinyl butyral) resin having a molecular weight less than about 140,000 Daltons.

Embodiment 18 is a multilayer laminate glass panel that includes the features of any of embodiments 10 to 17, wherein the poly(vinyl butyral) interlayer has a flow (measured as the DF135) of greater than about 0.18 mm.

Embodiment 19 is a multilayer laminate glass panel that includes the features of any of embodiments 10 to 18, wherein the poly(vinyl butyral) interlayer has a stress relaxation at 150° C. of less than about 100 Pascals.

EXAMPLES

The improvements (or reduction) in the level of edge defects in a multilayer glass laminate panel when produced using optimized autoclave conditions, such as a combination of reduced temperature and pressure, can be most readily appreciated by a comparison of multilayer glass laminate panels produced at different conditions, as described in more detail below.

The interlayers used in the multilayer glass laminate panels were either a single layer PVB interlayer having a glass transition temperature of about 30° C., which is commonly referred as standard PVB interlayer, or a tri-layer PVB interlayer having two rigid skin layers and a soft core layer, where the glass transition temperature of the core and skin layer were −2° C. and 30° C., respectively (commercially available PVB interlayers available from Solutia Inc., a subsidiary of Eastman Chemical Company under the trademark Saflex®).

The effect of pressure, temperature, and autoclaving time on edge bubble formation was studied in samples of multilayer glass laminate panels containing a multilayer (tri-layer) PVB interlayer sheet. The samples were each two pieces of 15 cm×15 cm, 2.3 mm thick glass with a commercially available multilayer interlayer (available as Saflex® PVB from Solutia Inc., a subsidiary of Eastman Chemical Company). The autoclaving parameters were varied independently so that the contribution of each of the parameters could be defined. In all examples illustrated below, the autoclave temperature was increased to the specified temperature at a rate of 6° C./min. and pressure was first increased to 3 bars and held for 5 min. before being increased to the final pressure. The pressure release temperature was 53° C. unless otherwise noted. In order to create edge bubbles in these small laminate samples, the autoclaving parameters were brought up to more extreme levels in some cases, which may be outside the normal boundaries for autoclaving multilayer glass laminate panels. Following the autoclaving, one set of the samples was immediately exposed to hot and humid conditions (40° C. and 90% RH) for 24 hours and was inspected for the amount of edge bubbles developed after the exposure; the other set was exposed to hot but less humid conditions (40° C. and less than 40% RH) for 24 hours. The laminates exposed to the latter, less extreme post autoclaving conditions did not develop edge bubbles as the autoclaving parameters were varied; the laminates exposed to the hot and humid post autoclaving conditions developed the edge bubbles dependent on the autoclaving parameters.

In the first table, multilayer glass laminate samples were tested to compare the effect of different autoclave hold pressures, from 5.5 bars to 13.8 bars, on the development of edge bubbles. The samples were each constructed using two pieces of 15 cm by 15 cm, 2.3 mm thick glass and a commercially available PVB multilayer interlayer. Three samples at each pressure were tested. The hold time was 35 minutes, and the hold temperature was 149° C. The number of edge bubbles in the sample was counted for each sample and the average for the three samples was calculated and reported. Results are shown in Table 1 below.

TABLE 1

Autoclave Hold Pressure vs. Edge Bubble Formation

| No. | Hold pressure (bars) | Hold temperature (° C.) | Hold time (min) | Number of edge bubbles | Regenerated Surface? |
|---|---|---|---|---|---|
| 1 | 13.8 | 149 | 35 | 4.6 | No |
| 2 | 11.7 | 149 | 35 | 2.3 | No |
| 3 | 9.7 | 149 | 35 | 0 | No |
| 4 | 7.6 | 149 | 35 | 0 | No |
| 5 | 5.5 | 149 | 35 | 0 | No |

Table 1 shows that as the autoclave hold pressure was reduced from 13.8 bars to 9.7 bars or less (while keeping autoclave hold time and hold temperature constant), the number of edge bubbles formed in the samples reduced to zero. Reducing the hold pressure about 2 bars, from 13.8 bars to 11.7 bars reduced the number of edge bubbles by half, from an average of 4.6 edge bubbles to an average of 2.3 edge bubbles. Further reducing the autoclave hold pressure eliminated the edge bubbles, as shown in Table 1. In all samples tested, the surface was not regenerated.

In the next table, multilayer glass laminate samples were tested to compare the effect of different autoclave hold temperatures, from 130° C. to 165° C., on the development of edge bubbles. The samples were each constructed using two pieces of 15 cm by 15 cm, 2.3 mm thick glass and a commercially available PVB multilayer interlayer. Three samples at each pressure were tested. The hold time was 35 minutes, and the hold pressure was 13.8 bars. The number of edge bubbles in the sample was counted for each sample and the average for the three samples was calculated and reported. Results are shown in Table 2 below.

TABLE 2

Autoclave Hold Temperature vs. Edge Bubble Formation

| No. | Hold pressure (bars) | Hold temperature (° C.) | Hold time (min) | Number of edge bubbles | Regenerated Surface? |
|---|---|---|---|---|---|
| 1 | 13.8 | 165 | 34 | 12 | No |
| 2 | 13.8 | 149 | 34 | 2.7 | No |
| 3 | 13.8 | 130 | 34 | 0 | No |

Table 2 shows that as the autoclave hold temperature was reduced from 165° C. to 149° C. or less (while keeping autoclave hold pressure and hold time constant), the number of edge bubbles formed in the samples reduced significantly. Reducing the hold temperature below 150° C., from 165° C. to 149° C., reduced the number of edge bubbles by more than half, from an average of 12 edge bubbles to an average of 2.7 edge bubbles. Further reducing the hold temperature to 130° C., eliminated the formation of edge bubbles. In all samples tested, the surface was not regenerated.

In the next table, multilayer glass laminate samples were tested to compare the effect of different autoclave hold times, from 20 minutes to 60 minutes, on the formation of edge bubbles. The samples were each constructed using two pieces of 15 cm by 15 cm, 2.3 mm thick glass and a commercially available PVB multilayer interlayer. Three samples at each hold time were tested. The hold temperature was 149° C., and the hold pressure was 13.8 bars. The number of edge bubbles in the sample was counted for each sample and the average for the three samples was calculated and reported. Results are shown in Table 3 below.

TABLE 3

Autoclave hold time at hold temperature vs. edge bubble formation

| No. | Hold pressure (bars) | Hold temperature (° C.) | Hold time (min) | Number of edge bubbles | Regenerated Surface? |
|---|---|---|---|---|---|
| 1 | 13.8 | 149 | 60 | 4.3 | No |
| 2 | 13.8 | 149 | 40 | 1.7 | No |
| 3 | 13.8 | 149 | 20 | 1.3 | No |

Table 3 shows that as the autoclave hold time was reduced from 60 minutes to 40 minutes or less (while keeping autoclave hold pressure and temperature constant), the number of edge bubbles formed in the samples reduced significantly. Reducing the hold time from 60 minutes to 40 minutes reduced the number of edge bubbles by more than half, from an average of 4.3 edge bubbles to an average of 1.7 edge bubbles. Further reducing the hold temperature to 20 minutes showed further improvement, reducing the number of edge bubbles to an average of 1.3 edge bubbles. In all samples tested, the surface was not regenerated.

Additional multilayer glass laminate samples were tested to check the effect of different autoclave conditions on performance properties (pummel adhesion and penetration resistance) of standard flow multilayer interlayers (Table 4), high flow multilayer interlayers (Table 5) and single layer, standard flow interlayers (Table 6). The samples for the Pummel Adhesion Test were each constructed using two pieces of 15 cm by 15 cm, 2.3 mm thick glass and a commercially available PVB multilayer interlayer. The samples for the Penetration Resistance Test were each constructed, as disclosed above, using two pieces of 30.5 cm by 30.5 cm, 2.3 mm thick glass and the commercially available PVB multilayer interlayer. The hold time was 20 minutes, and the hold temperature was 143° C., while the hold pressure varied from 4.1 bars to 12.8 bars. Pummel Adhesion and Penetration Resistance were tested as previously described. Results are shown in Table 4, Table 5 and Table 6 below.

TABLE 4

Standard Flow Multilayer Interlayer

| No. | Hold pressure (bars) | Hold temperature (° C.) | Hold time (min) | Pummel adhesion unit | Penetration resistance MBH, (m) | Regenerated Surface? |
|---|---|---|---|---|---|---|
| 1 | 12.8 | 143 | 20 | 3.5 | 6.7 | No |
| 2 | 9.7 | 143 | 20 | 4 | 6.4 | No |
| 3 | 6.9 | 143 | 20 | 3.5 | 6.8 | No |
| 4 | 4.1 | 143 | 20 | 4 | 6.3 | No |

TABLE 5

High Flow Multilayer Interlayer

| No. | Hold pressure (bars) | hold temperature (° C.) | hold time (min) | pummel adhesion unit | Penetration resistance MBH (m) | Regenerated Surface? |
|---|---|---|---|---|---|---|
| 1 | 12.8 | 143 | 20 | 5 | 6.3 | No |
| 2 | 9.7 | 143 | 20 | 5.3 | 6.5 | No |
| 3 | 6.9 | 143 | 20 | 4.5 | 6.9 | No |
| 4 | 4.1 | 143 | 20 | 5 | 6.5 | No |

TABLE 6

Standard (Single Layer) PVB Interlayer

| No. | Hold pressure (bars) | Hold temperature (° C.) | Hold time (min) | Pummel adhesion unit | Penetration resistance MBH (m) | Regenerated Surface? |
|---|---|---|---|---|---|---|
| 1 | 12.8 | 143 | 20 | 3 | 6.5 | No |
| 2 | 9.7 | 143 | 20 | 3 | 6.6 | No |
| 3 | 6.9 | 143 | 20 | 3.5 | 6.4 | No |
| 4 | 4.1 | 143 | 20 | 3.5 | 6.6 | No |

Table 4 shows that using a standard flow interlayer, such as a multilayer interlayer, in a multilayer glass laminate sample and autoclaving the sample at the optimized conditions (that is, at a reduced hold temperature and hold time) while varying the hold pressure from a high pressure of more than 12 bars (12.8 bars) to a low pressure of 4.1 bars still produces laminates where adhesion and penetration resistance are unaffected by the optimized conditions, and the multilayer glass laminate panels have acceptable adhesion and penetration resistance levels (mean break height). In all samples tested, the surface was not regenerated.

Table 5 shows that for all samples tested, the surface was not regenerated when using a high flow interlayer, such as a multilayer interlayer, in a multilayer glass laminate sample and autoclaving the sample at reduced hold temperature (143° C.) and hold time (20 minutes) while varying the hold pressure from a high pressure of more than 12 bars (12.8 bars) to a low pressure of 4.1 bars still produces laminates where adhesion and penetration resistance are unaffected by the optimized conditions, and the multilayer glass laminate panels have commercially acceptable adhesion and penetration resistance levels (mean break height). In all samples tested, the surface was not regenerated.

Table 6 shows that using a standard, commercially available PVB (monolithic) interlayer in a multilayer glass laminate sample and autoclaving the sample at reduced hold temperature (143° C.) and hold time (20 minutes) while varying the hold pressure from a high pressure of more than 12 bars (12.8 bars) to a low pressure of 4.1 bars still produces laminates where adhesion and penetration resistance are unaffected by the optimized conditions, and the multilayer glass laminate panels have commercially acceptable adhesion and penetration resistance levels (mean break height). In all samples tested, the surface was not regenerated.

Additional sample multilayer laminate glass panel samples containing either standard PVB interlayer or multilayer PVB interlayer were prepared as described above. Half of the samples were subjected to a standard de-airing process and then baked in an oven at 120° C. for two hours (also referred to as the "Bake Test"). When the samples were removed from the oven, they were visually inspected for bubbles formed at the edge of the samples. No bubbles were observed in the laminates containing either the standard PVB interlayer or the multilayer PVB interlayer. The other half of the samples were subjected to conventional autoclaving conditions (temperature of 143° C., pressure of 12.8 bars and 20 minutes hold time) and then baked in an oven at 120° C. for two hours. When the samples were removed from the oven, they were visually inspected for bubble formation at the edges of the samples. Many bubbles were observed in the edges of the laminate samples. The large number of bubbles observed in the multilayer laminate glass panels prepared by conventional autoclaving and then subjected to the bake test is one indication of the amount of air that is introduced and dissolved in the interlayer during conventional autoclaving processes. Additional bake tests with multilayer glass laminate samples produced using the optimized autoclave conditions revealed significantly less bubble formation in the edges of the multilayer glass laminate samples. Using the process of the present disclosure and the optimized autoclaving conditions significantly reduced the amount of air dissolved in the interlayer during the autoclaving processes, as indicated by the significantly lower number of bubbles formed.

With the dimensions of the multilayer laminate glass panel samples involved in the study at the temperature and autoclaving soak time used, the edge bubbles significantly diminish in the multilayer laminate glass panels at the autoclaving pressure of between 9 to 10 bars and lower.

In conclusion, the multilayer glass laminate panels comprising an interlayer that were produced using the optimized autoclave conditions as described herein have advantages over multilayer glass laminate panels as previously produced in the art. The use of the optimized autoclave conditions to produce multilayer glass laminate panels results in significantly decreased levels of edge defects, such as edge bubbles, and therefore improved optical quality of glass panels. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

The invention claimed is:

1. A process for producing a multilayer glass laminate panel comprising two glass sheets with a poly(vinyl butyral) interlayer sandwiched therebetween, the process comprising the steps of:
    providing two glass sheets;
    providing a poly(vinyl butyral) interlayer, wherein said interlayer is tri-layer having two rigid skin layers and a soft core layer, where said skin layers have a glass transition temperature of from 30° C. or greater and said core layer has a glass transition temperature of less than about 4° C. and inserting the interlayer between the two glass sheets to produce a laminate;
    removing air from the produced laminate; and
    autoclaving the laminate for a hold time, wherein the heat is at a temperature in the range of from about 110° C. to about 155° C., the pressure is from 4.1 to about 6.9 bars, and the hold time is in a range of from about 10 minutes to about 60 minutes;
    wherein the glass laminate panel is free of bubbles at the edges of the laminate panel;
    and wherein the pummel adhesion rating ranges from 3 to 7.

2. The process of claim 1, wherein the heat is at a temperature in the range of from about 115° C. to about 150° C.

3. The process of claim 1, wherein the heat is at a temperature in the range of from about 130° C. to about 150° C.

4. The process of claim 1, wherein the hold time is in a range of from about 20 minutes to about 40 minutes.

5. A process for producing a multilayer glass laminate panel comprising two glass sheets with a poly(vinyl butyral) interlayer sandwiched therebetween, the process comprising the steps of:
    providing two glass sheets;
    providing a multilayer poly(vinyl butyral) interlayer wherein said interlayer is tri-layer having two rigid skin layers and a soft core layer, where said skin layers have a glass transition temperature of from 30° C. or greater and said core layer has a glass transition temperature of less than about 4° C., and inserting the interlayer between the two glass sheets to produce a laminate;
    removing air from the produced laminate; and
    autoclaving the laminate for a hold time, wherein the heat is at a temperature in the range of from about 110° C. to about 155° C., the pressure is in a range of from about 4.1 to about 6.9 bars, and the hold time is in a range of from about 10 minutes to about 60 minutes and wherein the glass laminate panel is free of bubbles at the edges of the laminate panel and wherein the pummel adhesion rating ranges from 3 to 5.

6. The process of claim 5, wherein the heat is at a temperature in the range of from about 130° C. to about 150° C.

7. The process of claim 5, wherein the hold time is in a range of from about 20 minutes to about 40 minutes.

* * * * *